United States Patent [19]
Sukeda et al.

[11] Patent Number: 5,295,121
[45] Date of Patent: Mar. 15, 1994

[54] MAGNETO-OPTIC RECORDING/REPRODUCING METHOD AND DEVICE AND MAGNETO-OPTIC RECORDING MEDIUM USED FOR THEM

[75] Inventors: Hirofumi Sukeda, Kokubunji; Keizo Kato, Hachioji, both of Japan

[73] Assignee: Hitachi, Ltd., Tokyo, Japan

[21] Appl. No.: 304,203

[22] Filed: Jan. 31, 1989

[30] Foreign Application Priority Data

Feb. 3, 1988 [JP] Japan .................................. 63-21953

[51] Int. Cl.$^5$ ............................................. G11B 11/10
[52] U.S. Cl. ........................................................ 369/13
[58] Field of Search ................. 369/275.2, 13; 360/59, 360/114, 135; 365/122

[56] References Cited

U.S. PATENT DOCUMENTS

| | | |
|---|---|---|
| 3,510,658 | 5/1970 | Rabedeau . |
| 3,696,346 | 10/1972 | Zook . |
| 4,176,377 | 11/1979 | Howe ................................. 358/128 |
| 4,516,234 | 5/1985 | Nakagawa et al. ............... 369/275.2 |
| 4,566,088 | 1/1986 | Yoshida et al. ................... 369/275.2 |
| 4,737,947 | 4/1988 | Osato et al. ............................ 360/59 |
| 5,065,377 | 11/1991 | Spruit et al. ......................... 360/114 |

FOREIGN PATENT DOCUMENTS

| | | |
|---|---|---|
| 105344 | 8/1981 | Japan . |
| 57-18247 | 11/1982 | Japan . |
| 57-74852 | 11/1982 | Japan . |
| 62-95754 | 2/1987 | Japan . |
| 62-175948 | 8/1987 | Japan . |

OTHER PUBLICATIONS

Technical Report at the Academic Society of Electronic, Information and Communication MR 87-37 (1987) pp. 13 to 20.

Proc. Int. Symp. on Optical Memory, 1987 Japanese Journal of Applied Physics, vol. 26 (1987) Supplement 26-4.

Primary Examiner—Stuart S. Levy
Assistant Examiner—Kevin M. Watkins
Attorney, Agent, or Firm—Antonelli, Terry, Stout & Kraus

[57] ABSTRACT

A magneto-optic recording medium in which a vertically magnetized film on which magnetized domains are recorded by applying a light beam and an outer magnetic field is provided along a recording track and structure bands which do not contribute to read out of the magnetized domains are provided on both sides of the recording track so that the magnetization state of the magnetized domains recorded on the vertically magnetized film is read from an area limited by the width of the recording track. By scanning the magneto-optic recording medium along the recording track with a light beam having a diameter larger than the width of the recording track so as to heat an area larger than the width of the recording track to a temperature exceeding the curie temperature of the vertically magnetized film and also by applying a magnetic field in a predetermined direction to the area irradiated with the light beam, the magnetized domains are recorded in accordance with the direction of the applied magnetic field, and the magnetization state of the magnetized domains is read out only from the area limited by the width of the recording track through the magneto-optic effect.

4 Claims, 5 Drawing Sheets

RUNNING DIRECTION OF
LASER OPTICAL SPOT

RUNNING DIRECTION OF
LASER OPTICAL SPOT

MAGNETO-OPTIC RECORDING/REPRODUCING METHOD AND DEVICE AND MAGNETO-OPTIC RECORDING MEDIUM USED FOR THEM

BACKGROUND OF THE INVENTION

The present invention relates to a magneto-optic recording/reproducing method and device and a magneto-optic recording medium used for them. More particularly, the present invention relates to a magneto-optic recording/reproducing method which is suitable to accurately demodulate data at a high speed by suppressing jitter due to "feather-shaped magnetic domains" which will be generated in performing overwrite through magnetic field modulation.

A magneto-optic disk has been identified as an optic disk which can rewrite information. The magneto-optic disk, using a vertically magnetized film as a recording film, forms recording domains through a thermomagnetic effect and reproduces them through a magneto-optic effect. More specifically, the recording domains are formed as follows. The temperature of the magnetized film is increased to its Curie temperature by irradiating a laser optical spot to remove the magnetization of the irradiated area, and in the cooling process an external magnetic field is applied to fix the vertical magnetization of the optical spot irradiated area in the direction of the magnetic field, thereby forming the recording (magnetized) domains.

The method for forming such magnetized domains includes two techniques. One is an optical modulation technique which, with an external magnetic field with a certain intensity applied in the direction opposite to the direction of initial magnetization of the vertically magnetized film, modulates the intensity of the laser optical spot in accordance with the data to be recorded. The other is a magnetic field modulation technique which, with the laser optical spot with a certain intensity applied to increase the temperature of the magnetized film to its Curie temperature or more, modulates the direction of the external magnetic field. For example, the technical Report at the Academic Society of Electronics, Information and Communication (DENSI JOHO TSUSIN GAKKAI GIJUTSU HOKOKU) MR 87-37 (1987), pages 13 to 20, discloses that a storage density of 0.6 μm/bit is obtained at a scanning speed (linear velocity) of a laser light beam of 1.2 m/sec. through the magnetic field modulation technique.

However, this reference does not refer to the influence from the angular projections of the recorded magnetized domains and the change of the center position and width of the magnetized domains, and also does not entirely consider problems in the case of overwrite and reproduction at a high speed and with a high density.

SUMMARY OF THE INVENTION

An object of the present invention is to provide a magneto-optic recording/reproducing method which can overwrite at a high speed and with a high density by recording/reproducing magnetized domains with a constant width and short angular projections irrespective of the characteristics of the recording device and recording film.

Another object of the present invention is to provide a magneto-optic recording/reproducing method which, even if the recording device is changed or the servo-system of light beams is changed, does not deteriorate the SIN due to incomplete erasure after repeated overwrite using a single laser beam.

Still another object of the present invention is to provide a magneto-optic recording/reproducing device for carrying out the above method and a magneto-optic recording medium used for it.

The present invention is characterized by using a magneto-optic recording medium in which a vertically magnetized film on which magnetized domains are recorded by applying a light beam and an external magnetic field is provided along a recording track, and structure bands which do not contribute to read out of the magnetized domains are provided on both sides of the recording track so that the magnetization state of the magnetized domains recorded on the vertically magnetized film is read out from an area limited by the width of the recording track. More specifically, the present invention is characterized as follows. By scanning the magneto-optic recording medium along the recording track with a light beam having a diameter larger than the width of the recording track so as to heat an area larger than the width of the recording track to a temperature exceeding the Curie temperature of the vertically magnetized film and also by applying a magnetic field in a predetermined direction to the area irradiated with the light beam, the magnetized domains are recorded in accordance with the direction of the applied magnetic field, and the magnetization state of the magnetized domains is read out only from the area limited by the width of the recording track through the magneto-optic effect. Namely, the magnetized domains are adapted to be recorded over the area larger than the width of the recording track to limit the width of the magnetized domains effectively contributing to information reproduction to the width of the recording track.

The structure bands for limiting the width of the magnetic domains effectively contributing to information reproduction to the recording track width can be constituted by a light shading band masking the vertically magnetized film from the light beam irradiated through a substrate or a low thermal conductivity material layer which cuts off the heat of the light beam from the vertically magnetized film. The vertically magnetized film may be removed from the structure band and may be provided on only the recording track. By limiting the recording track width using such a structure band, the width of the magnetized domains effectively contributing to information reproduction may be made constant irrespectively of the width variation of the recorded magnetized domains due to the variation of a recording condition and a medium characteristic, and the influence of the angular projections of the recorded magnetized domains for the information reproduction can be removed.

In accordance with the present invention, the variation of the width of the recorded magnetized domains depending on the difference of the recording condition and the medium characteristic can be removed and extension of the angular projections of the recorded magnetized domains due to the increase of the scanning speed of a laser light beam can be reduced so that the compatibility and overwrite characteristic of an optical recording medium can be enhanced and high speed high density recording can be realized.

Further, by suppressing a leak from the vertically magnetized film of a recording medium, the recording can be performed with a lower laser power. Then, the same laser power permits a medium moving at a higher speed to be recorded, i.e. higher speed recording.

These and other objects and many of the attendant advantages of the present invention will be readily appreciated as the same becomes better understood by reference to the following detailed description when considered in connection with the accompanying drawings.

DESCRIPTION OF THE PREFERRED EMBODIMENTS

First, a problem to be solved by the present invention will be explained in connection with the drawings.

Figure 7:
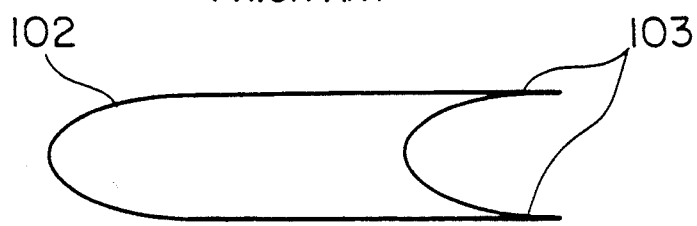
FIG. 7 is a view showing a magnetized domain shape.

One of the problems in the magnetic field modulation technique is that )as shown in FIG. 7, the shape of the recorded magnetized domain 102 is a feather which is asymmetrical from front to rear. This is because the temperature distribution in the vertically magnetized film at the moment when the application direction of a recording magnetic field is reversed is reflected in the recording shape of the magnetized domain. The temperature distribution of the vertically magnetized film depends a balance of the thermal conductivity and the beam speed in the vertically magnetized film. Further, two forked angular projections 103 at the rear of the feather shape will be extended as the scanning speed of the laser beam is increased during the recording. If the angular projections 103 of the magnetized domain 102 are long, the signal amplitude will be reduced during the high density recording and also jitter will be produced during the recording/reproduction.

Figure 8:
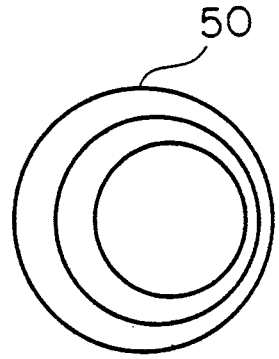

If the scanning speed of the laser beam is as low as about 1 m/sec, the thermal conduction speed in the vertically magnetized film is sufficiently larger than the scanning speed. Thus, the temperature distribution 50 in the vertically magnetized film in the neighborhood of the area irradiated with the laser beam is substantially isotropic as shown in FIG. 8 so that the edge shape of the magnetized domain is semi-circular. Therefore, if the width of the magnetized domain is set to about 0.8 to 1 μm, the length of the angular projections may also be 0.4 to 0.5 μm. In this case, the signal band width required for reproduction is narrow and so the detection is hardly subjected to random noise so that the recording/reproduction with the bit pitch of about 0.5 μm can be carried out using the laser beam spot having a diameter of about 1.6 μm.

Figure 9:
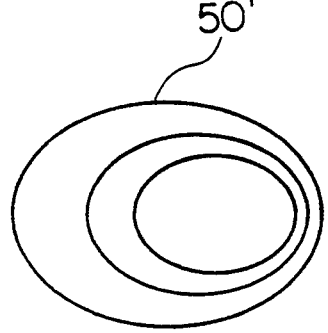

On the other hand, if the scanning speed of the laser beam is 7 m/sec or more, the temperature distribution 50' in the vertically magnetized film is a shape having a trail left on the opposite side to the moving direction of the laser beam spot as shown in FIG. 9 so that the edge shape of the magnetized domain is parabolic. Then, if the width of the magnetized domain is set to about 0.8 to 1 μm, the length of the angular projections will be as large as 0.6 μm or more. In this case, the edge interval longer by 0.2 μm or more is required so that a recordable/reproducible bit pitch is 0.7 μm or more. Incidentally, although the length of the angular projections will be short if the width of the magnetized domain to be recorded, the reproduced signal/noise ratio required for data demodulation can not be assured. Thus, if the scanning speed of the laser beam is 7 m/sec or more, the attainable bit pitch will be 0.7 μm or more. Accordingly, it has been conventionally considered to be impossible to satisfy both the conditions of the bit pitch of 0.7 μm or less and the data transfer speed of 10M bit or more/sec since the length of the angular projections of the magnetized domain will be extended as the scanning speed is increased.

Further, the temperature distribution of the vertically magnetized film also depends on the change of the power and focal point of the laser beam and the difference in the recording medium characteristic so that the position and shape of the magnetic domains will be changed. This gives rise to incomplete erasure of the recorded magnetized domains during overwrite, and jitter during recording/reproduction.

Thus, in the case the magnetic field modulation technique is to be applied to a magneto-optic recording/reproducing device, it is important to suppress the extension of the angular projections 103 of the recorded magnetized domains 102 and enhancement of incomplete erasure.

Figure 4:
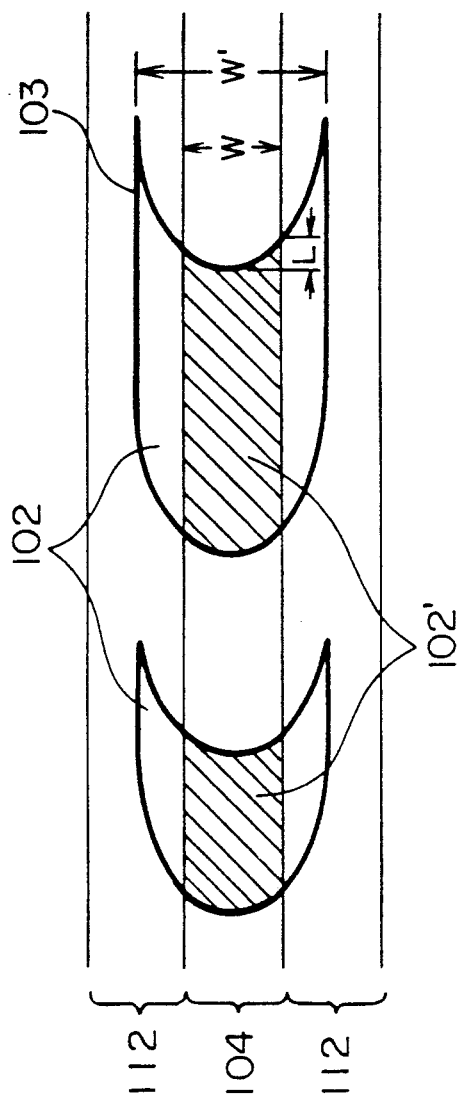
FIG. 4 is a view showing the shape of recorded magnetized domains in the embodiment of FIG. 1.

To this end, the present invention adopts an arrangement that, as shown in FIG. 4, the width of the magnetized domains 102' which effectively contribute to information reproduction is limited by the width of a land portion 104 which is a recording track. Namely, in accordance with the present invention, structure bands 112 which do not contribute to the read-out (reproduction) of magnetized domains are arranged on both sides of the land portion 104 which is a recording track. More specifically, by scanning the magneto-optic recording medium along the recording track (land portion) 104 with a light beam having a diameter larger than the width w of the recording track to heat an area larger than the width of the recording track to a temperature exceeding the Curie temperature of the vertically magnetized film and also applying a magnetic field in a predetermined direction to the area irradiated with the light beam, the magnetized domains 102 are recorded in accordance with the direction of the applied magnetic field over the area larger than the width w of the recording track 104. And, during the reproduction, the width of the magnetized domains effectively contributing to information reproduction is limited to the width w of the recording track 104 by the structure bands 112 so that the magnetization state of the magnetized domains is read out only from the limited area 102' through the magneto-optic effect. This limitation of the width w of the magnetized domains permits the magnetized domain 102' having a constant width to be provided, and permits the reproduction to be freed from the influence of the two forked angular projections 103 at the rear of the feather shaped magnetized domains 102 formed by the recording while assuring the reproduced signal/noise ratio required for data demodulation.

Figure 10A:
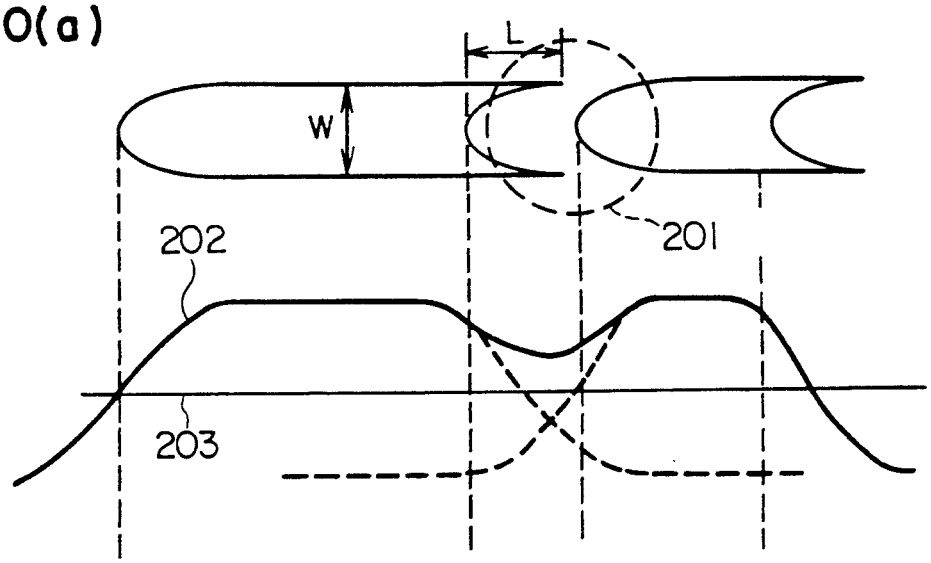
FIGS. 10(a) and 10(b) are graphs showing the relation between the magnetized domains and the reproduced signals.
Figure 10B:
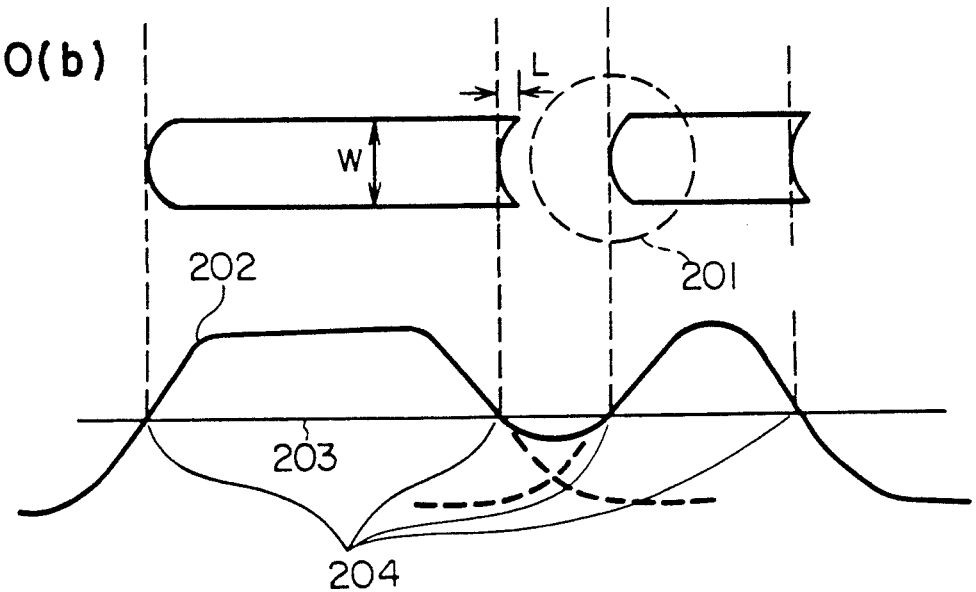

Now, in the case of the pit-edge recording in which information is recorded to correspond to the edge of a magnetized domain, the relation among the width w of magnetized domains, light beam spots 201 for recording/reproduction, reproduced signals 202, and detection levels 203 are shown in FIGS. 10(a) and 10(b). If the relation between the magnetized domain width w and the length L of the angular projections is L>w/2 as shown in FIG. 10(a), the portion of the reproduced signal 202 corresponding to two closely adjacent edges can not be accurately demodulated since the signal 202 does not fall below the detection level 203 due to the influence of such long angular projections. On the other hand, if the width (the shaded portion in FIG. 4) of the magnetized domains 102 effectively contributing to information reproduction is limited by the width of the land portion 104 in accordance with the present invention, the above relation can be set to be L<w/2 as shown in FIG. 10(b). Thus, the edge position of a magnetized domain 102' has a one-to-one correspondence to a detection timing edge 204 resulted by slicing the reproduced signal 202 by the detection level 203, which permits accurate data demodulation at a high speed high density recording of the laser beam scanning speed of 7 m/sec or more.

Figure 1:
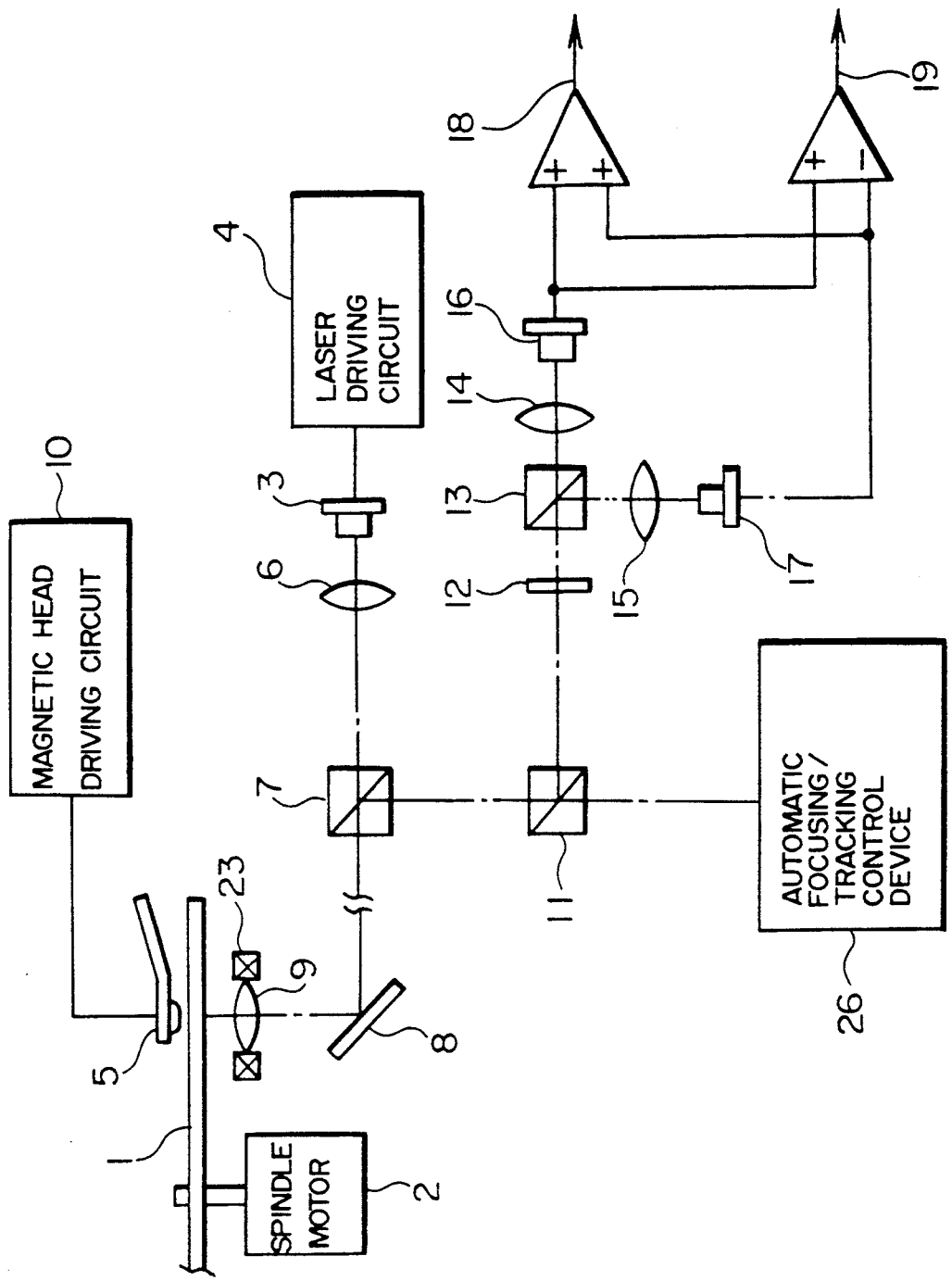
FIG. 1 shows an arrangement of a magneto-optic disk device showing one embodiment of the magneto-optic recording/reproducing method according to the present invention.
Figure 2:
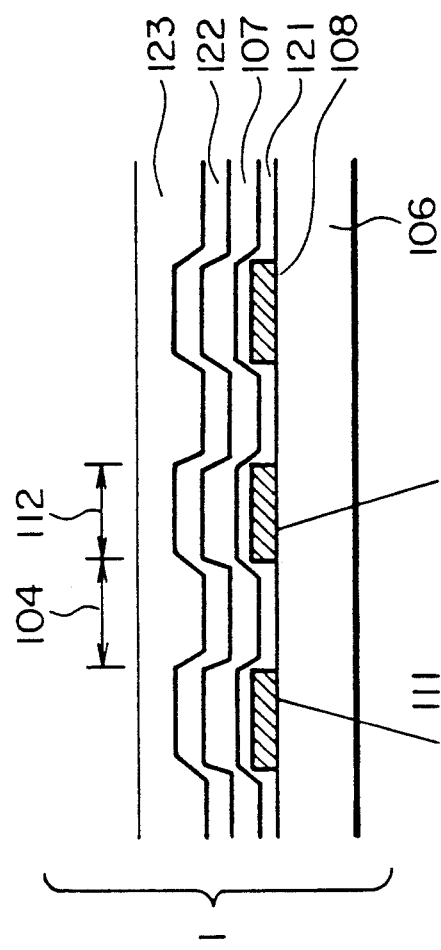
FIG. 2 is a sectional view of one embodiment of a magneto-optic disk used in the above embodiment of FIG. 1.
Figure 3:
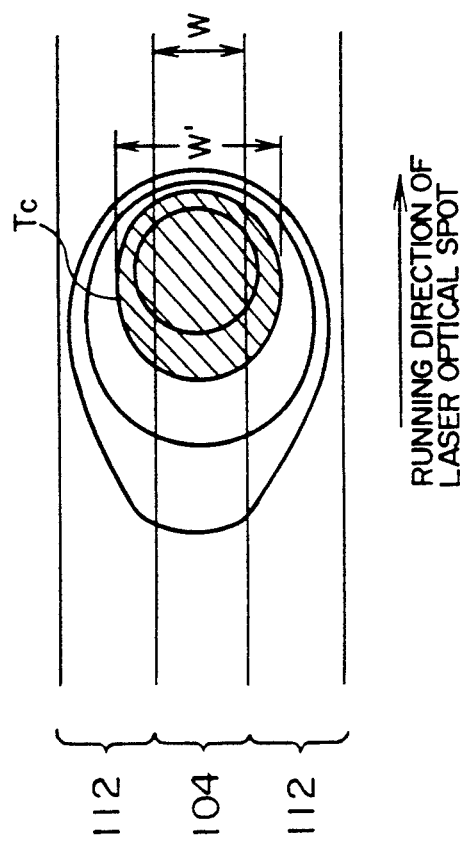
FIGS. 3, 8 and 9 are schematic diagrams showing isotherms during recording.

Explanation will be given for embodiments in connection with the drawings. FIG. 1 shows an arrangement of a magneto-optic disk device showing one embodiment of the magneto-optic recording/reproducing method according to the present invention; FIG. 2 is a sectional view of one embodiment of a magneto-optic disk used in the above embodiment of FIG. 1; FIG. 3 is a schematic view showing the temperature distribution in the neighborhood of a laser beam spot during recording in the embodiment of FIG. 1; and FIG. 4 is a view showing the shape of a recorded magnetized domain in the embodiment of FIG. 1.

The embodiment shown in FIG. 1 shows an arrangement of the magneto-optic disk device using one light beam. A disk 1 which is a recording medium is a magneto-optic disk having a vertically magnetized film mainly consisting of e.g. a Tb-Fe-Co compound. The section of the disk 1 is shown in FIG. 2.

In FIG. 2, 106 is a substrate which is made of glass or transparent resin (e.g. polycarbonate, polystyrene, acrylic, ultraviolet setting resin, etc.). 107 is a vertically magnetized film which is a magneto-optic recording film of a rare earth transition metal system (e.g. or Tb-Fe-Co compound, a Tb-Fe compound, a Cd-Fe-Co compound, etc.). In this embodiment, the vertically magnetized film 107 is deposited uniformly and continuously on substantially, i.e. virtually, the entire surface of the substrate 106. 108 is a light shading band for forming structure bands 112 which shade the vertically magnetized film 107 from a laser beam 111 irradiated through the substrate 106. The light shading band 108 may be a metallic thin film made of e.g. molybdenum, aluminum, etc. The substrate 106 may be reinforced glass having an outer periphery of $\phi$ 130 mm and a thickness of about 1 mm. Formed on the substrate 106 through the vacuum evaporation technique is a metallic aluminum layer several hundred Å or so thick in order to form the light shading bands 108 and also serving as a guide groove for tracking in a push-pull manner. A positive type photo resist is spin-coated on the entire surface to form a photoresist layer on the metallic aluminum layer. This photoresist layer is exposed to light and developed using a projection mask aligner to form a spiral mask (having a line width of 0.8 $\mu$m) with a pitch of 1.6 $\mu$m. The portion of the metallic aluminum layer which is not masked is etched away to provide the light shading band 108 of a spiral shape having a line width of 0.8 $\mu$m at a pitch of 1.6 $\mu$m. Thereafter, a protection film 121 made of SiN having a thickness of 700 Å and having a Kerr enhancement effect, the vertically magnetized film 107 made of Tb-Fe-Co having a thickness of 1000 Å, and a protection film 122 made of SiN having a thickness of 1500 Å are successively formed through the sputtering technique. Finally, a protection coating 123 having a thickness of about 5 $\mu$m is formed in order to improve the sliding movement resistance of the disk. This protection coating 123 can be formed by irradiating the spin-coated ultraviolet setting resin with ultraviolet rays. Through the above process, there can be obtained the magneto-optic disk 1 in which the land portion 104 serving as a recording track and the structure band 112 serving as a light shading band 108 are formed at a track pitch of 1.6 $\mu$m and a width of 0.8 $\mu$m. The laser light beam 111 for recording/reproducing does not reach the vertically magnetized film 107 on the structure band 112 because of the presence of the light shading band 108. Thus, as shown in FIG. 4, only the area 1021 limited by the land portion 104 which is 0.8 $\mu$m wide of the recorded magnetized domains 102 effectively contributes to information recording/reproducing. Incidentally, although the metallic thin film has been used as the light shading band 108 in the above example, any structure which can shade the laser light for reproduction may be adopted.

Again referring to FIG. 1, the magneto-optic disk 1 is adapted to be rotatable by a spindle motor 2. Data recording on the magneto-optic disk 1 is carried out as follows. A semiconductor laser 3 is caused to emit light with a high power by a laser driving circuit 4. The laser driving circuit 4, in response to an instruction from a recording/reproducing control system (not shown), causes the semiconductor laser 3 to emit the light with a low power during the data reproducing and with a high power during the data recording to heat the recording film to its Curie temperature, at which the magnetization of the recording film can be reversed, through the magnetic field produced from a magnetic head 5. The laser driving circuit 4 may be a circuit used in the conventional write-once type optical disk device.

The light beam emitted from the semiconductor laser 3 is changed to a parallel light by a lens 6. The parallel light, passing through a beam splitter 7, is reflected in a vertical direction by a galvanomirror 8, and converged as a minute spot on the recording film 107 of the disk 1 by a convergence lens 9 through the disk substrate 106. If the wavelength of the laser beam emitted from the semiconductor laser 3 is 830 nm and the numerical aperture of the convergence lens 9 is 0.53, the diameter at the spot periphery (hereinafter referred to as the light spot diameter) with a light intensity $e^{-2}$ times as high as that at the spot center is about 1.6 $\mu$m. Then, the track pitch of about 1.6 $\mu$m is suitable in view of the separation degree of tracks and the modulation degree of the tracking signal in a push-pull manner. Further, the S/N of a magneto-optic signal is not so high so that the width of magnetized domains is desired to be large to provide a high signal modulation degree. However, if the magnetized domain width exceeds 0.9 μm, the crosstalk from the adjacent track is abruptly increased. Therefore, the width of the land portion 104 of the disk 1 is set to 0.8 μm in accordance with a suitable width of the magnetized domains. The laser beam spot having a diameter of 1.6 μm travels along the center of the land portion 104, i.e., the center of the recording track. During the recording, the intensity of the recording laser light beam is set in accordance with the scanning speed (line speed) of the laser light beam so that as shown in FIG. 3 the width w' of the area (shaded portion) surrounded by the isotherm in the neighborhood of the Curie temperature Tc in the temperature distribution of the area irradiated with the laser light beam 111 is larger than the width w of the recording track (land portion), e.g. 1 to 1.6 μm. For example, if for the scanning speed of the laser light beam 111 of 7 m/sec, the recording laser light intensity is 8 mW, the width w' of the area surrounded by the isotherm of the Curie temperature Tc is 1.3 μm.

When the temperature of the vertically magnetized film 107 is enhanced by heat of the laser beam spot 111, the modulated magnetic field in accordance with the data to be recorded is applied from the magnetic head 5 to perform data recording, i.e. to form magnetized domains. Incidentally, the area which is applied with the magnetic field from the magnetic head 5 is larger than the area irradiated with the laser beam spot so as to cover it so that the recorded magnetized domains reside in the area surrounded by the isotherm of Tc. As described above, in the case of recording in the area irradiated with the beam spot of 8 mW at a scanning speed of 7 m/sec, the temperature of the vertically magnetized film 107 is enhanced to the Curie temperature Tc or more over the width w', e.g. 1.3 μm, so that the overwrite of data, i.e. recording which also serves to erase the previously recorded data, can be realized over the entire width w (e.g. 0.8 μm) of the land portion. The magnetic head 5 is arranged so as to slightly float above the surface of the disk 1. The distance between the magnetic head 1 and the disk may be several tens of μm. This distance is larger than in the magnetic disk device which does not have an auxiliary means such as a light spot, so that the problem of a head crash injuring the magnetic head 5 and the disk 1 rarely occurs. The magnetic head driving circuit 10 has a function of changing the direction of the magnetic field produced from the magnetic head 5 and its construction may be the same as the circuit used in the conventional magnetic disk device.

The reproduction of data (magnetized domains) recorded on the disk 1 will be explained. The laser driving circuit 4, in response to an instruction from the recording/reproducing control system (not shown), causes the semiconductor laser 3 to emit the light with a low power. The light emitted from the semiconductor laser 3 has a polarization plane in a certain direction. This light, passing through the same light path as in the recording, is irradiated to the vertically magnetized film 107 on the disk 1. The part that participates in the reproduction is only the land portion 104 having a width w' (e.g. 0.8 μm) which is in the neighborhood of the center of the magnetized domains 102 recorded with a width w (e.g. 1.3 μm). Therefore, as shown in FIG. 4, the width of the magnetic domains 102' which effectively contribute to the recording/reproducing is limited by the width of the land portion 104 to be 0.8 μm, so that the length of the angular projections can be limited to be less than 0.4 μm. Further, even if incomplete erasure due to incomplete overwrite is present on both sides of the magnetized domains 102 having a width of 1.3 μm, it can be effectively separated from the reproduction because of the presence of the structure bands 112 constructed by the light shading bands 108. Thus, the overwrite operation which is theoretically free from the incomplete erasure can be obtained. The magnetization direction of the recorded magnetized domains is fixed in an upward or downward direction in accordance with the recorded data. Therefore, by detecting the magnetization direction it is decided whether the recorded data is "1" or "0". Such detection is carried out using the Kerr effect which is one of the magneto-optic effects. The Kerr effect means that the polarization plane of a reflected light rotates left or right with respect to an incident polarization plane in accordance with the magnetization direction of an upward or downward direction. The reflected light beam from the vertically magnetized film 107 which experiences the polarization plane rotation is reflected beam splitters 7 and 11 again and guided to a ½ wavelength plate 12. The ½ wavelength plate 12 is an optical device which serves to rotate the polarization plane by 45°. The light with its polarization plane rotated by 45° is separated into a p polarized-light component and an s polarized-light component, which are orthogonal to each other, by a polarized-light beam splitter 13. Both components are converged onto photodetectors 14 and 15, and 17 through lenses 16 respectively. Taking a sum of the outputs from the photodetectors 16 and 17 provides only the variation of the light intensity irrespective of the rotation of the polarization plane.

On the other hand, taking a difference between the outputs from the photodetectors 16 and 17 provides the change of the magnetization direction as a signal change corresponding to the rotation of the polarization plane. Namely, the sum signal 18, which represents only prepits previously formed on the disk 1, and the difference signal 19, which represents only the change of the magnetization direction of the vertically magnetized film on the disk 1 i.e., the recorded data (magnetized domains), can be detected in an optically separated manner. The light beam passing through the beam splitter 11 enters an automatic focussing and tracking control system 26 and is used to detect a focusing point deviation signal and a tracking deviation signal. By driving e.g. an actuator 23 by these signals, automatic focusing adjustment and tracking control are carried out.

In accordance with this embodiment, in the case where the disk 1 is rotated at a high speed and the scanning speed (linear speed) of the laser light beam is as high as 7 m/sec, it is possible to prevent the angular projections of the magnetized domains from being extended. Thus, it is possible to accurately carry out the data recording/reproducing at a high speed and with a high density without deteriorating the SIN due to incomplete erasure after repeated overwrites.

Figure 5:
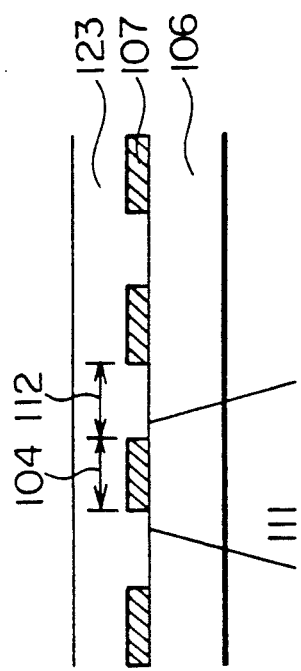
FIG. 5 is a sectional view of a second embodiment of a magneto-optic disk according to the present invention.

FIG. 5 is a sectional view of a second embodiment of the magneto-optic recording medium used in the present invention. In FIG. 5, the land portion 104 and the structure band 112 are formed by depositing the magnetized film having a width of e.g. 0.8 μm, on the substrate 106 at a track pitch of 1.6 μm in a spiral or concentric circle shape. A protection coating 123 is also formed in order to improve the sliding movement resistance.

Since the magnetized domains 102 are formed on only the vertically magnetized film 107 constituting the land portion (recording track) 104, if the magnetized domains 102 are recorded so that the width of the area heated to the Curie temperature Tc or more during the recording is larger than the width of the land portion 104, the width of the recorded magnetized domains 102 is limited by the width of the land portion 104.

Figure 6:
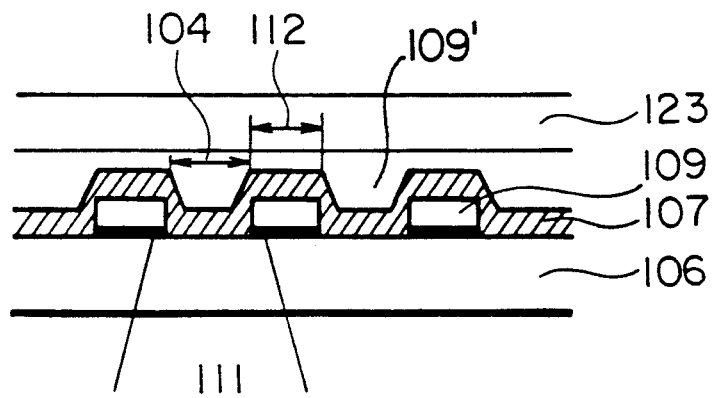
FIG. 6 is a sectional view of a third embodiment of a magneto-optic disk according to the present invention.

FIG. 6 is a sectional view of a third embodiment of the magneto-optic recording medium used in the present invention. A low thermal conductivity material layer 109 is formed in a strip shape on the substrate 106 and thereafter the vertically magnetized film 107 having a certain thickness and another low thermal conductivity material layer 109' made of e.g. $SiO_2$ are successive deposited through the sputtering technique. Alternatively, if the vertically magnetized film 107 is made of a compound of a rare earth transition metal system (e.g. Tb-Fe-Co), after grooves are formed on the substrate through the etching technique using photoresist, the vertically magnetized film 107 having a certain thickness and the low thermal conductivity material layer 109' made of $SiO_2$ may be successively formed through the sputtering technique (since the thermal conductivity of the substrate 106 is lower than that of the vertically magnetized film 107 by one order of magnitude or more). In this case also, the protection coating 123 is formed in order to improve the sliding movement resistance. In the case where the laser light beam 111 is irradiated onto the land portion (recording track) 104 for data recording, the magnetized domains are not extended over the land portion 104 since the land portion 104 and structure band 112 are thermally separated from each other by the low thermal conductivity material layers 109 and 109'. Therefore, if the magnetized domains 102 are recorded with the light intensity by which the temperature at the boundary between the land portion 104 and the structure band 112 exceeds the Curie temperature, the width of the recorded magnetized domains is limited by the width w of the land portion (recording track) 104. Further, in the second and third embodiments of the magneto-optic recording medium, the temperature of the vertically magnetized film 107 on the land portion (recording track) 104 can be easily enhanced during the recording due to the adiabatic effect on both sides of the land portion (recording track) 104 so that the recording sensitivity is improved, which is very advantageous for high speed recording.

In all the cases mentioned above, the width of the magnetized domains 102' effectively contributing to data reproduction can be defined by the width of the land portion 104 that is a recording track.

Although the magnetic field modulation overwrite system as shown in FIG. 1 has been explained as the embodiment of the present invention)the present invention can be also applied to other systems, e.g. the optical modulation as disclosed in JP-A-62-175948. In the case of the optical modulation system, the problems of teardrop shape domains, thermal interference among domains, etc. occur due to the influence from the thermal conduction in the vertically magnetized film a s disclosed in the Proceedings of the International Symposium on Optical Memory, JJAP, Vol. 26 (1987), Supplement 26-4, p. 243 to 248. Although in the conventional system, the width and length of domains must be simultaneously controlled, in accordance with the present invention, only the domain length has to be controlled, thereby making easy the high density recording. Incomplete erasure can be prevented in the overwrite using a single beam.

Further, since in the above embodiment the position deviation of the magnetized domains in the width direction is not produced, the tracking margin as well as the erasure characteristic in the overwrite can be improved.

As mentioned above, in accordance with the present invention, there can be obtained a magneto-optic recording/reproducing method which, irrespective of the kind of a recording/reproducing device or a vertically magnetized film, can provide high medium compatibility and overwrite with a high density at a high speed, and a magneto-optic recording medium. Also, the reproduced signal/noise due to incomplete erasure is not deteriorated in the overwrite using a single beam.

We claim:

1. A magneto-optic recording/reproducing method comprising the steps of:
   on a magneto-optic recording medium having a recording track where at least a vertically magnetized film is provided and structure bands provided on both sides of the recording track, recording magnetized domains by scanning a light beam having a diameter larger than the width of the recording track along the recording track so as to heat an area larger than the width of the recording track to a temperature exceeding the Curie temperature of the vertically magnetized film and applying a magnetic field in a predetermined direction to the area irradiated with the light beam, whereby said magnetized domains are recorded in accordance with the direction of the applied magnetic field, and
   reading out the magnetization state of the magnetized domains only from an area limited by the width of the recording track through a magneto-optic effect;
   wherein the magnetized domains are recorded in such a manner that the direction of applying said magnetic field is changed in accordance with a signal to be recorded; and
   wherein the area of said magnetized domains limited by the width of said recording track is a feather shape having forked projections extending in the direction of scanning said light beam, and the length of said projections along said recording track is smaller than ½ of the width of said recording track.

2. A magneto-optic recording/reproducing device comprising:
   light irradiation means for irradiating a magneto-optic recording medium with a light beam, said magneto-optic recording medium having a recording track where at least a vertically magnetized film is provided and structure bands provided on both sides of the recording track, said light beam having a diameter larger than the width of the recording track, and
   magnetic field applying means for applying a magnetic field in a predetermined direction to an area of said magneto-optic recording medium irradiated with said light beam,
   wherein in recording, magnetized domains are recorded by heating an area larger than the width of the recording track to a temperature exceeding the Curie temperature of the vertically magnetized film using said light beam from said light irradiation means, whereby said magnetized domains are recorded in accordance with the direction of the applied magnetic field, and in reproduction, the magnetization state of the magnetized domains is read out from only an area limited by the width of the recording track using the light beam from said light irradiation means;

wherein the magnetized domains are recorded in such a manner that the direction of applying said magnetic field is changed in accordance with a signal to be recorded; and wherein the area of said magnetized domains limited by the width of said recording track is a feather shape having forked projections extending in the direction of scanning said light beam, and the length of said projections along said recording track is smaller than ½ of the width of said recording track.

3. A magneto-optic recording/reproducing method comprising the steps of:

on a magneto-optic recording medium having structure bands not contributing to information reproduction provided adjacent to both sides of a recording track so that said recording track has a width smaller than a diameter of a light beam for information reproduction, recording magnetized domains by scanning said recording track with a light beam so as to heat an area larger than a width of said recording track to a temperature exceeding the Curie temperature of a vertically magnetized film of said magneto-topic recording medium and applying a magnetic field corresponding to an input signal to the area irradiated with said light beam, and reading out the magnetization state of said magnetized domains through a magneto-optic effect under the condition that the shape of the magnetized domains which effectively contributes to reproduction satisfies the relation $L<w/2$, where w represents the width of the magnetized domains along the recording track, and L represents the distance from a blanching point to the tip of forked angular projections extending from the rear portion of the magnetized domains.

4. A magneto-optic recording medium comprising:
a substrate;

two structure bands provided on the substrate, the two structure bands being separated from each other to define a recording track therebetween; and a vertically magnetized film provided on the substrate and the two structure bands such that the two structure bands are disposed between the substrate and the vertically magnetized film, the vertically magnetized film being continuous over virtually the entire substrate;

wherein magnetic domains are recorded on the vertically magnetized film by radiating a light beam having a diameter larger than a width of the recording track through the substrate and applying an external magnetic field to the magneto-optic recording medium while controlling a direction of the external magnetic field such that the magnetic domains are recorded on the vertically magnetized film in accordance with the direction of the external magnetic field;

wherein the two structure bands have a thermal conductivity sufficiently lower than a thermal conductivity of the vertically magnetized film such that the structure bands help prevent heat from the light beam radiated through the substrate from influencing the vertically magnetized film in areas of the magneto-optic recording medium other than the recording track such that the magnetic domains are recorded on the vertically magnetized film only within the width of the recording track;

wherein the two structure bands protrude from a surface of the substrate, thereby causing the vertically magnetized film to have an uneven surface, and further comprising a layer disposed on the vertically magnetized film; and wherein the layer has a thermal conductivity sufficiently lower than the thermal conductivity of the vertically magnetized film such that the layer cooperates with the two structure bands to prevent heat from the light beam radiated through the substrate form influencing the vertically magnetized film in areas of the magneto-optic recording medium other than the recording track such that the magnetic domains are recorded on the vertically magnetized film only within the width of the recording track.

* * * * *